Mar. 20, 1923.
J. P. BREEN.
LEVEL WINDER FOR REELS.
FILED OCT. 22, 1921.
1,448,786.
2 SHEETS—SHEET 1.
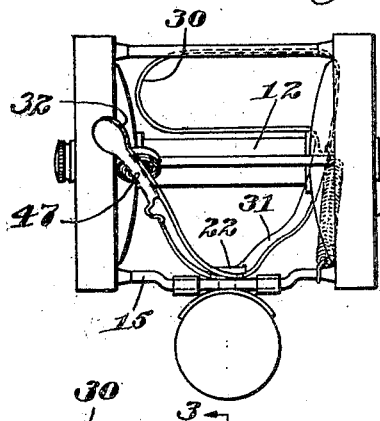
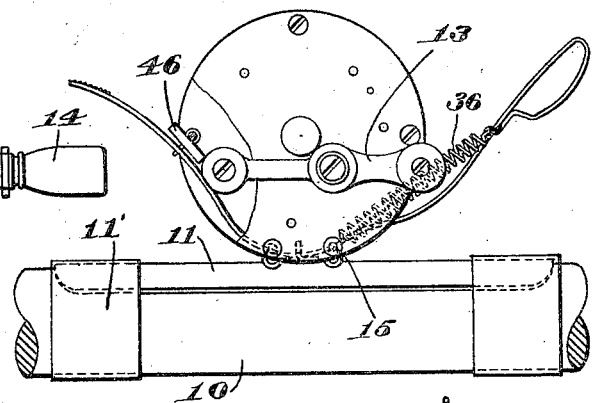
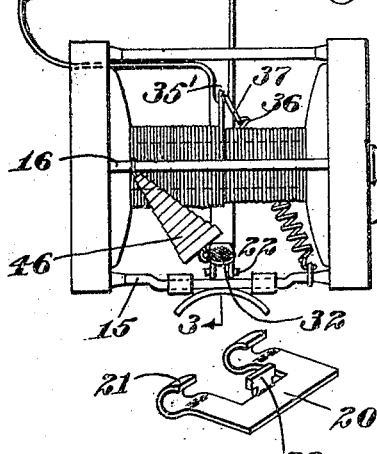
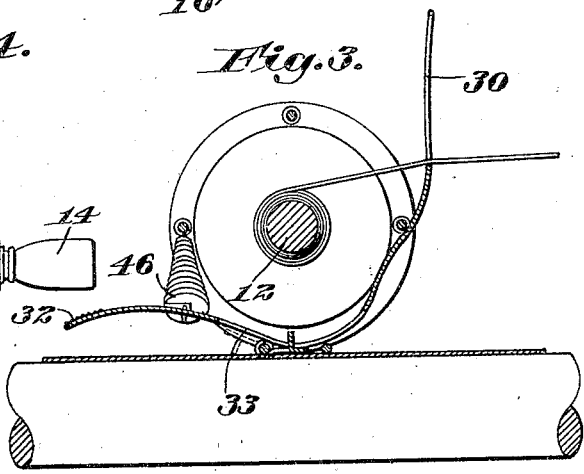
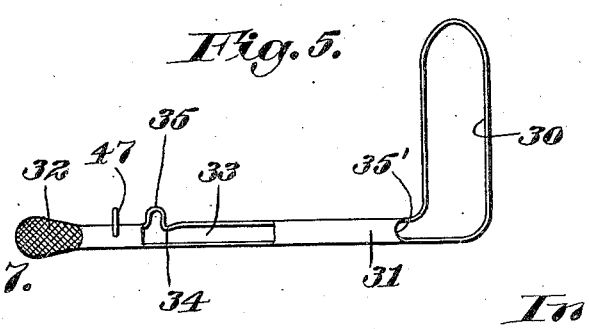
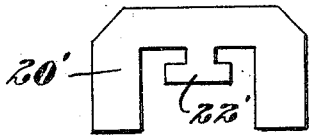
Inventor
James P. Breen
by Mitchell, Chadwick & Kent.
Attorneys Mar. 20, 1923. 1,448,786.
J. P. BREEN.
LEVEL WINDER FOR REELS.
FILED OCT. 22, 1921. 2 SHEETS—SHEET 2.
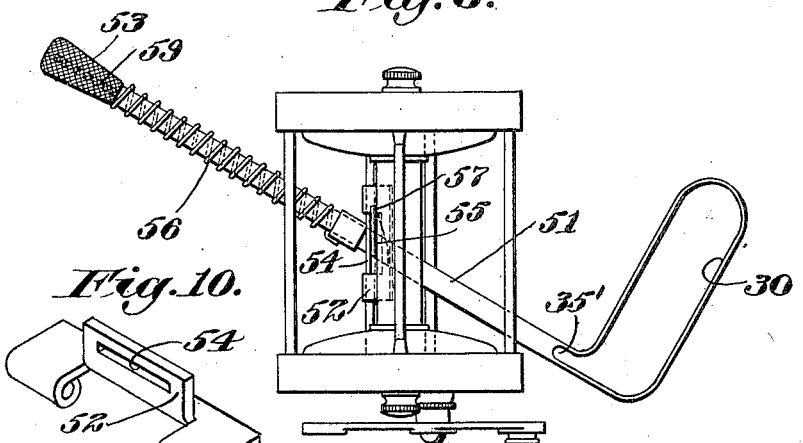
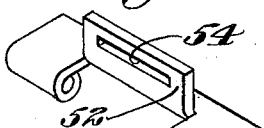
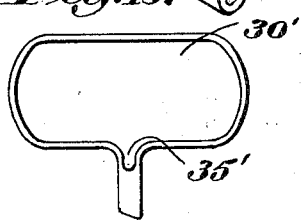
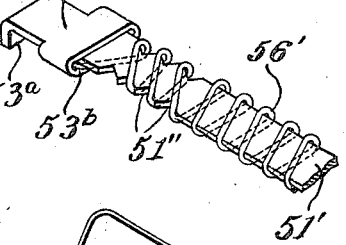
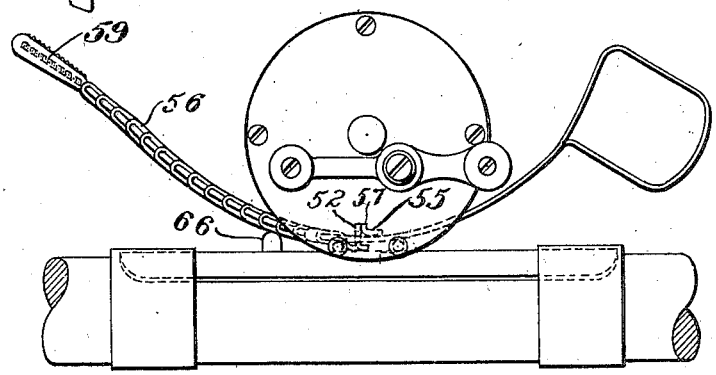
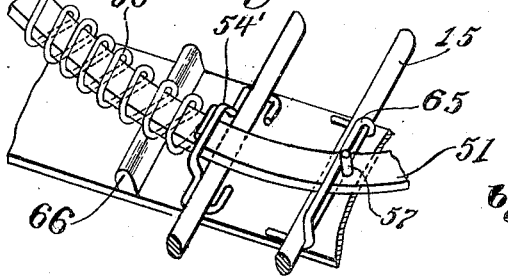
Inventor
James P. Breen
by Mitchell, Chadwick & Kent
Attorneys Patented Mar. 20, 1923.

1,448,786

UNITED STATES PATENT OFFICE.

JAMES P. BREEN, OF ROCKPORT, MASSACHUSETTS.

LEVEL WINDER FOR REELS.

Application filed October 22, 1921. Serial No. 509,519.

*To all whom it may concern:*

Be it known that I, JAMES P. BREEN, a citizen of the United States, residing at Rockport, in the county of Essex and State of Massachusetts, have invented certain new and useful Improvements in Level Winders for Reels, of which the following is a specification.

This invention relates to improvements in level-winders for fishing reels. More particularly it relates to the apparatus used for making a more or less level coil on the reel when the line is being drawn in, in such manner that the line will unwind freely when cast. In the absence of special apparatus it has heretofore been necessary for the fisherman to grasp the rod with his left hand above the reel, in order to guide the incoming line with the thumb and forefinger of this hand while turning the crank with his right hand; and under these circumstances the left hand has to be aided by thrusting the butt end of the rod against the front of the fisherman's body in an attitude and with results which produce discomfort especially when long continued. Various devices have been proposed to provide a movable thread guide for the incoming line that can be controlled by one's thumb while holding the rod near the butt, in which case one would be able to hold the rod with one hand alone; but none of these have proven practicable so far as I am aware. The present invention is an improvement, in that while it provides a guide for the incoming line operable by the thumb of a person holding a rod near the butt with his left hand alone, the whole is so arranged that when the line is cast the line passes out freely without any retarding contact with the guide such as has been present in devices proposed for this purpose heretofore. The automatic transfer of the line from thus running free, when cast, to the guided restraint for level winding when drawn in is another feature; also the means by which the line is at all instants under control so as to be entered in the guide. Other features make the device readily applicable to existing reels, as well as new reels; make it easily attachable to and detachable from such reels, and provide the improvements and advantages in other respects which comprise the apparatus described.

These objects are accomplished by providing a line guide which consists of a large loop of wire whose bight normally stands stationary opposite the space through which the line runs, when cast, as it unwinds from the reel and runs to and fro from side to side over the surface of the spool in so doing. The loop is large enough to overlie approximately the whole of this entire space. In the lower part of this loop is a notch which constitutes a guide for the line when the line is being drawn in and wound. Said notch may normally stand, unused, below the level at which the line unwinds when cast; but for use it is raised above the level. The tension on the line then draws the line into the notch; and there is means by which the person holding the rod can shuttle the guide back and forth across the face of the reel, with the thumb of his hand which is holding the rod while the other hand is engaged in turning the crank. The said means is a conveniently placed thumb lever; and it is a further feature of the invention that this normally stands up at the rear of the reel in position to be easily depressed and swung back and forth, and when released is automatically returned to the position in which the line lies freely in the large portion of the loop. The combined lever-and-loop element is mounted pivotally and slidably on the base frame of the reel, by providing a long narrow slot in a curved middle portion of the lever, through which slot passes the stem of a T-headed fulcrum fixed on the mounting-base of the reel. The lever can slide past this T-head longitudinally of the rod to turn its front portion upward and backward, and can swing to right and left, when properly pushed by one's thumb. When the thumb lever is depressed the thumb part comes down into a position of approximate parallelism with the rod, in which, by the changed leverage, only a short side swinging of the thumb is necessary to make the desired to and fro swinging of the notch guide; on somewhat further slipping through the slot, it is possible to disengage the parts in order to demount the reel and winder.

Other features of the invention will appear upon consideration of the specific embodiment thereof which is shown herein as an illustration of the construction and use of the apparatus. It will be understood that variations may be made from the specific construction illustrated without departing from the scope of the invention. It is intended that the patent shall cover by suitable expression in the appended claims wherever features of patentable novelty exist in the invention disclosed.

In the accompanying drawings:

Figure 1 is a side elevation showing a section of fishing rod with a reel thereon and with a device embodying the invention attached thereto in its normal position, as when ready for casting;

Figure 2 is an end elevation of the rod, showing side of the reel with the attachment of the invention in the same position as in Figure 1;

Figure 3 is a view similar to Figure 1, but in medial section on the line 3—3 of Figure 4, and with the guide arranged in position for drawing in the line;

Figure 4 is a view corresponding to Figure 2 but showing the parts arranged as in Figure 3;

Figure 5 is a plan of the lever-and-guide element of the invention;

Figure 6 is a perspective of the fulcrum plate by which the device shown in Figure 5 is secured in place on the reel;

Figure 7 is a diagram of a blank for making the device of Figure 5;

Figure 8 is a plan showing a modified form of fulcrum plate and lever-and-guide element;

Figure 9 is a side view of the device shown in Figure 8, with additional guiding element;

Figure 10 is a perspective of the fulcrum plate shown in Figures 8 and 9;

Figure 11 is a perspective showing another style of spring and thumb piece;

Figure 12 is a perspective, considerably enlarged, showing a still further modification of the fulcrum plate and associated parts; and Figure 13 is a view showing a modified form of a detail.

Referring to the drawings, 10 indicates a fishing rod which may be of any suitable style, and 11 is the base plate for securing the reel thereon, fastening means of the well known slip ring type being shown. The reel may be of any suitable type, as, for example, and as illustrated, of that type in which the winding barrel 12 is driven through concealed gearing and a crank 13 by crank handle 14.

A fulcrum for the attachment of the invention is provided by means of a plate 20, seen in Figure 6 which may be formed from a blank 20′ seen in Figure 7 by rolling up the ends of a U-shaped piece as at 21, so that they will hook over one of the cross pieces 15 of the reel which lies at the bottom next to the base, and by turning up a stub T end 22 which has been cut flat in the form 22′ of Figure 7, so that when turned up and installed it constitutes a T-headed fulcrum, the leg of whose T is perpendicular to the axis of the rod and the head of whose T constitutes a couple of lugs facing toward the axis of the rod. This being installed under the middle of the reel, with the fulcrum T-head standing up, the lever-and-guide member may be associated with it. The latter may conveniently be made from a piece of stiff wire bent into the shape illustrated in Figures 1, 3, and 5. This has, at its forward end, a broad and wide loop 30 extending laterally from the stem 31; and has at the rear a portion 32 adapted to be engaged frictionally by one's thumb, these forward and rear parts being connected by a stem with slot 33 extending longitudinally thereof and wide enough for the pin constituted by the leg part of the T-fulcrum 22 to slide along it. At its rear end a narrowing of the slot, at 34, makes it somewhat difficult for said leg of the T to pass to the very end of the slot where is an enlargement of width 35 through which even the head of the T can be passed. This provides means for the insertion of the T fulcrum for travel in the middle and forward end of slot, between positions illustrated in Figures 2 and 3. The part of the stem between the slot and the loop 30 may have solder or other device to strengthen and stiffen the whole, and to provide a smooth round notch or throat 35′ at the beginning of the loop, on the lower side thereof. This forms a guide for the line, when the line runs therein. The loop, as seen in Figure 2, is approximately large enough to leave the entire space opposite the barrel open for the line to play back and forth from end to end of the barrel, without hindrance of any sort; and when the apparatus stands at rest the loop is at such elevation that the lower corner notch 35′ thereof is too low for the line to run into it naturally, and is also too far to one side. It is held in this position by the means provided for positioning the lever.

When the lever is assembled with the T-headed fulcrum, as seen best in Figure 2, the lever, which is preferably curved in the shape seen in profile in Figures 1 and 3 can be swung to the right and left about the leg of the T as can readily be understood from Figure 2. It can also be slid forward, away from the eye of the observer in Figure 2, by pressing the thumb piece 32 toward the fulcrum. The curvature is such that the lever slides easily from the position of Figures 1 and 2 to that of Figure 3, where the fulcrum is in the middle of the slot 33; and in so doing the curvature of the section of stem, at the place where the slot is, gives whole stem and loop a sort of revolving direction, about the axis of the reel, in which the forward end 30 swings upward and backward toward the reel to the position shown in Figure 3. This action is insured by provision of a spring 36, which may be a light spiral spring, hooked at one end to a little ring 37 provided for it next to the notch 35′, and at its other end fastened to one of the base rods 15 of the reel; so that when the lever is pushed forward the spring 36, extended thereby, draws the top or loop portion backward toward the reel. When the lever is released this spring returns the lever and loop to the position of Figures 1 and 2. When one depresses the thumb piece 32 he naturally moves his thumb over to the middle of the rod as seen in Figure 4; in such case, because of the fulcrum 22, the notch 35′ is swung around from its extreme side position (Figure 2) to a middle position (Figure 3) and thereby the spring 36 is stretched; so that, when the parts are released, the spring 36 also tends to draw the notch 35′ over to position at the side of, as well as below, the level at which the line unwinds from the barrel. A similar end may be attained by providing a spring at another place, the same being marked 46, and connected from one end of the midheight rear cross bar 16 of the reel to a link 47 near the thumb end of the lever. Preferably this spring also is a spiral spring, but on account of the small space into which it must collapse it may be made of flat metal like a clock spring and may be pulled out into a cone shape as illustrated, the large end being either down, as illustrated, or next to the bar 16, as may be most convenient. If preferred, and as illustrated, both of these springs may be used on the same apparatus. In another figure of the drawing still another spring is illustrated, which may supplant both of these.

In use, a man lets the device alone while casting. The loop 30 then occupies the position seen in Figure 2, and lets the line run out freely, and absolutely without any retardation because of its presence; and there is plenty of room to get his right thumb on the reel as a brake. On beginning to draw in the line by turning the crank 14, with one hand, holding the rod in his other hand, in this case the left hand, at the butt of the rod where the whole balances well so that he can manage the rod with one hand, the user puts his thumb on the thumb piece 32, depresses it, and thus raises the lower limb of the loop 30 against and causes the line to seek the lowest part of the loop, which is the notch 35′. By pushing the user causes the notch 35′ to swing near enough to the line so that the line slips into it. If preferred the lower part of the loop 30 may be made sloping slightly toward the notch so as to cause the line to slip in more readily. In either event the tension then holds the line down in the notch and that notch therefore acts as a guide for the line and leads the line to and fro to different parts of the barrel for winding thereon as the user moves his thumb to and fro from side to side. As soon as the thumb piece is released the spring or springs which control it throw it back to the position of Figure 2, and the apparatus becomes ready for casting.

It is desirable that apparatus of this sort should be readily demountable. This is provided in the case of Figures 1–6 by making the springs 36 and 46 attached firmly at one end and merely hooked in place at the other end, and by making the lever detachable from the fulcrum T-head holder as above described. To get the fulcrum 22 out of the way when the lever has been demounted and it is desired to wind the reel full, it is only necessary to throw it over on its hinges 21 from the position shown in full lines in Figure 3 to that shown in dotted lines.

In the apparatus illustrated anyone desiring to cast with the right hand must then transfer the rod to the left hand for the winding to be made with the right hand. The invention provides means by which one may cast and hold by the same hand. As illustrated this would be the left hand; but it would be a simple change to have the thumb lever bound over to the right of the rod, in which case the notch 35′ would be made at the left and the loop would be reversed in direction therefrom; so that one could cast and hold with his right hand, without having to shift, and would then wind with his left hand.

A modification is shown in Figure 8 in which the function of springs 36 and 46 is served by a spiral spring 56 coiled on a stem 51 between the fulcrum plate 52 and the thumb piece 53. In this case there is no slot 33 in the stem, but the fulcrum plate 52, whose shape is shown in Figure 10, has a slot 54 through which the stem 51 passes; and the slot edges and ends constitute the fulcrum for the swinging of the lever, in place of the downward faces of the T-head and side faces of the T-leg at fulcrum 22. In both cases it is a pin and slot mounting. There is, however, a special device for causing the normal position of the thumb rest 53 to be over at one side of the reel. This consists of a lug 55 whose tip 57 stands out at a little distance from the stem and whose base is further along on the stem, so that when the spring 56 draws the stem backward the base of the lug can continue to move after the leading end of the lug has encountered the fulcrum plate, and has thereby been arrested. The continued action of the spring then swings the lever around the obstructed leading end of the lug, so that it comes to rest at an angle with the axis of the rod equal to the angle which the lug makes with the stem—unless it is sooner arrested by the ends of the slot 54 which has become oblique to the line of the flat stem. Such a spring is easily installed and may be considered preferable to the others because less expensive. This style of apparatus is demounted by removing the thumb rest from the spring. In Figures 8 and 9 these are represented as if a terminal tongue 59 on the lever were screwed into the thumb piece. An arrangement that is probably preferable is shown in Figure 11, where the spring 56' holds itself and the thumb rest 53' on the stem 51' detachably. The thumb rest in this modification is a piece of sheet metal whose rear 53ª is bent down to form a flange and whose forward end has two side ears 53ᵇ which are bent downward and then bent underneath it to form a sort of tube into which the rear end of the flat stem 51' can be thrust till its rear end is stopped by the rear flange 53ª. Thus the thumb piece houses the rear end of the stem. Forward of this housing are edge notches 51" in the stem, large enough to receive the wire of the spring. The rear end of the elliptical spring is secured, as by solder, to the thumb plate; and the three or four elliptical convolutions of the spring which are just forward of the thumb plate are given a permanent set so that their major axes stand at an angle of some 30° or so with the major axes of the remaining convolutions of the spring. When the flat stem is thrust into the spring it slips easily along through all the forward convolutions thereof, and if the user with the thumb and finger pinches the rear part of the spring so that those convolutions are twisted into line with the forward ones, it also slips easily through the rear until stopped by the flange 53ª. When the user releases the rear convolutions of the spring, they cant to their set angle; more or less of them engage in the notches 51"; and these hold the spring and thumb piece to the stem. The stem is removable easily if the operator pinches them again into parallelism with the forward convolutions.

In the form illustrated in Figures 1–4 the lever is shown pivoted exactly in the middle under the reel, but in Figures 8 and 9 the fulcrum is under the rear cross bar of the reel. In the latter case the depression of the thumb rest may tend to swing the forward part of the stem into the zone occupied by the winding on the reel, or which ought to be left free to receive the winding. Figure 12 illustrates means that may be used to avoid that by arranging a light bar or wire 65 parallel to and over the forward bottom cross rod 15 of the reel so that the lever may be inserted between it and this cross rod. This prevents the forward part of the lever from swinging directly upward about the fulcrum, and requires it to slide forward when the thumb piece is depressed, in which case it can rise no higher into reeling space than is predetermined by the curvature thereof. Its own curvature causes it to rise as it slides forward. A similar effect may be gained by providing a guide underneath the lever at the rear of the fulcrum, at the space marked 66. Both of these are illustrated for the sake of showing the idea, but only one of which need be used in case it is desired to use this feature. In this case the transverse slot formed by the forward guide 65 should be longer than the fulcrum slot 54' in order to accommodate the side swinging of the stem, and the lug 57', shown in Figure 12, as a pin, should be set forward of the forward guide 65.

In both of the forms illustrated the thumb rest is shown at one side when in a position of rest. This is in order to leave the rear face of the reel accessible so that the person casting the line can use his thumb in the customary manner as a brake on the line which is wound on the reel. If the thumb rest were to stand normally central, with the line guiding notch correspondingly central, the shape of the loop 30 of Figure 2 would be more like a letter T, with respect to the notch 35, so as to permit the free movement of the line back and forth along the face of the reel while being paid out through the large part of the lug, as in Figure 13.

I claim as my invention,

1. An attachment for a reel comprising a line guide consisting of an element having a notch whose top is open, to above the level of ordinary winding, and has sufficient width in said top opening for the line to play back and forth across the face of the reel substantially without moving the notch, and is arranged for the line to pass easily into and out of the notch, combined with means to move the notch back and forth across the face of the reel.

2. An attachment for a reel comprising a line guide consisting of an element having a notch whose top is open, to above the level of ordinary winding, arranged for the line to pass easily into and out of the notch; said notch being open into a large loop whose top is above the level of ordinary winding and which extends crosswise of the face of the reel, thereby permitting unretarded running out of the line when a cast is made.

3. An attachment for a reel comprising a line guide consisting of an element having a notch whose top is open, to above the level of ordinary winding, arranged for the line to pass easily into and out of the notch, combined with means to move the notch back and forth across the face of the reel; and means for raising and lowering the notch in order to catch the line in the notch and withdraw the notch from it.

4. An attachment for a reel comprising a line guide consisting of an element having a notch whose top is open, to above the level of ordinary winding, arranged for the line to pass easily into and out of the notch, combined with means to move the notch back and forth across the face of the reel, comprising a stem holding the notch; said stem being curved longitudinally and there being a fulcrum device retaining it in position and permitting it to slide and to turn laterally to and fro.

5. An attachment for a reel comprising a line guide consisting of an element having a notch whose top is open, to above the level of ordinary winding, arranged for the line to pass easily into and out of the notch, combined with a lever for operating said element whose fulcrum has retaining means permitting the lever to swing and to slide.

6. An attachment for a fishing reel comprising a fulcrum arranged between the barrel of the reel and the rod, combined with a lever secured to the rod at said fulcrum; said lever extending lengthwise of the rod, having a thumb rest at its rear and a line guide forward and having a connection with the fulcrum adapted to permit the lever to slide and to swing.

7. An attachment for a fishing reel comprising a fulcrum arranged between the barrel of the reel and the rod, combined with a lever secured to the rod at said fulcrum; said lever extending lengthwise of the rod, having a thumb rest at its rear and a line guide forward and having a connection with the fulcrum, adapted for movement of the lever forward and back, with respect to the fulcrum and there being elastic means tending to maintain the lever in its rear position; and means whereby the forward position is line guiding position and the rear position is non-guiding.

8. An attachment for a fishing reel comprising a fulcrum arranged between the barrel of the reel and the rod, combined with a lever secured to the rod at said fulcrum; said lever extending lengthwise of the rod, having a thumb rest at its rear and a line guide forward and having connection with the fulcrum adapted for movement of the lever forward and back; the said lever being curved at its middle portion approximately to an arc around the axis of the reel, whereby the forward sliding of the lever past the fulcrum causes its forward end to turn upward into line guiding position opposite the barrel.

9. An attachment for a fishing reel comprising a curved line-guiding lever fulcrumed between the reel and the rod, having a rear thumb rest piece for its control and adapted to slide into line guiding position when the thumb piece is depressed and away from line guiding position when the thumb piece is released.

10. An attachment for a fishing reel comprising a line guide having two positions forward of the reel, one of which is a line guiding position in which it is movable to right and left and the other which is a non-line guiding position in which it permits free passage of the line; and means to shift it from one to the other of the two positions; the sides of the said line guide being spread widely enough to underlie all positions which the line may occupy when said line guide is in non-line-guiding position, whereby on coming into guiding position it embraces the line in any of its free passage positions.

11. An attachment for a fishing reel comprising a line guide having two positions forward of the reel, one of which is a line guiding position in which it is movable to right and left and the other which is a non-line guiding position in which it permits free passage of the line, means actuated by the thumb of the user at the rear of the reel for shifting line-guide between its two said positions.

12. An attachment for a fishing reel comprising a lever fulcrumed between the reel and rod which holds the reel, having a line guide forward and a thumb piece for actuating it at the rear, combined with a spring engaged between the rod and the lever and tending to move the lever out of guiding position, said spring being arranged to oppose movement imparted to the lever through the thumb piece.

13. An attachment for a fishing reel comprising a lever fulcrumed between the reel and rod which holds the reel, having a line guide forward and a thumb piece for actuating it at the rear, combined with a spring between the rear of the lever and a part of the reel tending to push the thumb pieces rearward, and means for swinging the forward guide to one side.

14. An attachment for a fishing reel comprising a lever fulcrumed between the reel and rod which holds the reel, having a line guide forward and a thumb piece for actuating it at the rear, combined with a spring strung on the rear part of the lever, between the fulcrum and the thumb piece and tending to move it backward; there being a lug on the lever arranged forward of the fulcrum support and projecting toward rear of the lever and laterally outward therefrom, and adapted to engage a fixed part when the lever is driven backward by said spring, whereby the further pressure of the spring swings the lever crosswise of the rods.

15. An attachment for a fishing reel comprising a lever fulcrumed between the reel and rod which holds the reel, having a line guide forward, a lug rearward of the line guide and forward of the fulcrum and notches in its surface, still further to the rear, a thumb piece for actuating the lever adapted to be slipped onto its rear end, and a spring strung on the rear part of the lever, attached rigidly to said thumb piece and having offset coils adapted to engage the said notches, whereby the force of the spring tends to hold the lever rearward with its lug against the fulcrum, and holds the thumb piece in position on the lever.

16. An attachment for a fishing reel comprising a lever having a line guide forward and a stem extending rearward over cross pieces of the reel, a guide for said lever associated with one of said cross pieces adapted to permit the lever to slide, a spring exerting force on said stem rearward of said guide tending to move the lever backward; there being means on said stem engaging said guide to limit the rearward movement of the lever.

17. An attachment for a fishing reel comprising a lever having a line-guiding loop forward and a flat stem extending backward therefrom, with a lug rearward of the loop and with notches in its edges; a guide associated with a cross piece of the reel for positioning the lever and for coaction with the lug for limiting the backward movement of the lever; and a spring strung on said stem rearward of the guide, having offset convolutions adapted to engage said notches, whereby the force of the spring tends to maintain the stem with the lug against the guide, but yields under external pressure to permit forward movement of the loop into line guiding position.

Signed at Boston, Massachusetts, this seventeenth day of October, 1921.

JAMES P. BREEN.